US009235809B2

(12) United States Patent
Burchard

(10) Patent No.: US 9,235,809 B2
(45) Date of Patent: *Jan. 12, 2016

(54) PARTICLE METHODS FOR NONLINEAR CONTROL

(71) Applicant: Extendabrain Corporation, Laguna Niguel, CA (US)

(72) Inventor: Paul Burchard, Jersey City, NJ (US)

(73) Assignee: Paul Burchard, Jersey City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/595,479

(22) Filed: Jan. 13, 2015

(65) Prior Publication Data

US 2015/0127596 A1 May 7, 2015

Related U.S. Application Data

(63) Continuation of application No. 13/682,088, filed on Nov. 20, 2012, now Pat. No. 8,965,834.

(60) Provisional application No. 61/621,712, filed on Apr. 9, 2012, provisional application No. 61/567,823, filed on Dec. 7, 2011.

(51) Int. Cl.
*G06F 17/00* (2006.01)
*G06N 5/02* (2006.01)
*G06N 5/04* (2006.01)
*G06N 7/02* (2006.01)
(Continued)

(52) U.S. Cl.
CPC .............. *G06N 5/042* (2013.01); *G06N 3/006* (2013.01); *G06N 5/048* (2013.01); *G06N 7/00* (2013.01); *G06N 7/005* (2013.01); *G06N 7/02* (2013.01)

(58) Field of Classification Search
USPC .......................................... 706/47
See application file for complete search history.

(56) References Cited

U.S. PATENT DOCUMENTS 7,966,276 B2   6/2011   Cade
8,965,834 B2 *   2/2015   Burchard ............... G06N 7/02
                                                      706/52
(Continued)

OTHER PUBLICATIONS

Centralized Fusion Estimators for Multisensor Systems With Random Sensor Delays, Multiple Packet Dropouts and Uncertain Observations Jing Ma; Shuli Sun Sensors Journal, IEEE Year: 2013, vol. 13, Issue: 4 pp. 1228-1235, DOI: 10.1109/JSEN.2012.2227995 Referenced in: IEEE Journals & Magazines.*

(Continued)

*Primary Examiner* — Michael B Holmes
(74) *Attorney, Agent, or Firm* — Banner & Witcoff, Ltd.

(57) ABSTRACT

Aspects herein describe new methods of determining optimal actions to achieve high-level goals with minimum total future cost. At least one high-level goal is inputted into a user device along with various observational data about the world, and a computational unit determines, through particle methods, an optimal course of action as well as emotions. The particle method comprises alternating backward and forward sweeps and tests for convergence to determine said optimal course of action. In one embodiment a user inputs a high-level goal into a cell phone which senses observational data. The cell phone communicates with a server that provides instructions. The server determines an optimal course of action via the particle method, and the cell phone then displays the instructions and emotions to the user.

20 Claims, 7 Drawing Sheets

(51) Int. Cl.
 G06N 7/00 (2006.01)
 G06N 3/00 (2006.01)

(56) References Cited

U.S. PATENT DOCUMENTS

2013/0151460 A1* 6/2013 Burchard ............... G06N 7/02
 706/52
2015/0127596 A1* 5/2015 Burchard ............... G06N 7/02
 706/47

OTHER PUBLICATIONS

Sensor configuration selection for discrete-event systems under unreliable observations Wen-Chiao Lin; Tae-Sic Yoo; Garcia, H.E. Automation Science and Engineering (CASE), 2010 IEEE Conference on Year: 2010 pp. 477-484, DOI: 10.1109/COASE.2010.5584637 Referenced in: IEEE Conference Publications.*
Selecting observation platforms for optimized anomaly detectability under unreliable partial observations Wen-Chiao Lin; Garcia, H.E.; Tae-Sic Yoo American Control Conference (ACC), 2011 Year: 2011 pp. 4470-4477, DOI: 10.1109/ACC.2011.5991124 Referenced in: IEEE Conference Publications.*
Robust sensor characterization via max-mixture models: GPS sensors Morton, R.; Olson, E. Intelligent Robots and Systems (IROS), 2013 IEEE/RSJ International Conference on Year: 2013 pp. 528-533, DOI: 10.1109/IROS.2013.6696402 Referenced in: IEEE Conference Publications.*
Blackmore, Ono, Bektassov and Williams, "A Probabilistic Particle Control Approximation of Chance Constrained Stochastic Predictive Control", IEEE Transactions on Robotics 26, 2010.
Boyd, Gintis and Bowles, "Coordinated Punishment of Defectors Sustains Cooperation and Can Proliferate When Rare", Science, vol. 328, Apr. 30, 2010.
Carvalho, Johannes, Lopes and Polson, "Particle Learning and Smoothing", Statistical Science, vol. 25, No. 1, 88-106, 2010.
Falcone, "A Numeriacl Approach to the Infinite Horizon Problem of Deterministic Control Theory", Applied Mathematics and Optimization 15: 1-13, 1987.
Gintis, "The Bounds of Reason, Game Theory and the Unification of the Behavioral Sciences", ISBN 978-0-691-14052-0, Princeton University Press, 2009.
"Rationality and its Discontents", The Economic Journal No. 542, p. F162, 2010.
Kappen, "A linear theory for control of non-linear stochastic systems", Physical Review Letters, Oct. 5, 2005.
Osher and Sethian, "Fronts Propagating with Curvature-Dependent Speed: Algorithms Based on Hamilton-Jacobi Formulations" Journal of computational Physics 79, 1998.
J.A. Sethian, "A fast marching level set method for monotonically advancing fronts", Proceedings of the National Academy of Sciences, vol. 93, pp. 1591-1595, Feb. 1996.
Emanuel Todorov, "Efficient computation of optimal actions", Proceedings of the National Academy of Science vol. 106, No. 28, Jul. 14, 2009.
Censi, Calisi, De Luca and Oriolo, "A Bayesian framework for optimal motion planning with uncertainty", IEEE International Conference on Robotics and Automation, Pasadena, CA, May 19-23, 2008.
Sebastian Thrun, "Probabilistic Robotics", Communications of the ACM, vol. 45, No. 3, Mar. 2002.

* cited by examiner

PARTICLE METHODS FOR NONLINEAR CONTROL

CROSS REFERENCE TO RELATED APPLICATIONS

This application is a continuation of U.S. application Ser. No. 13/682,088, filed Nov. 20, 2012, and having the title "Particle Methods for Nonlinear Control," which claims priority to provisional U.S. Application Ser. No. 61/621,712, filed Apr. 9, 2012, having the title "Particle Methods for Nonlinear Control in High Dimensions", and to provisional U.S. Application Ser. No. 61/567,823, filed Dec. 7, 2011, having the title "Intelligent Devices", each of which is herein incorporated by reference in its entirety for all purposes.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

Aspects described herein relate to computers, software, and artificial intelligence. More specifically, aspects relate to goal-oriented optimization for artificial intelligence systems.

BACKGROUND

Artificial intelligence is used to find non-obvious strategies and tactics to achieve high-level goals, while having limited ability to affect the world, and limited ability to observe the world.

Problem solving in robotics and similar disciplines usually involves control problems. In real-world and in sophisticated virtual environments, various ambiguities and uncertainties arise as a problem progresses and the robot or computer solving the problem takes action. Control problems usually have two parts, an estimation problem, which naturally runs forward in time, and a regulation problem, which naturally runs backwards in time. Previously, scientists in robotics have used particle methods to find solutions for estimation problems with high degrees of uncertainty by using particle methods. For example, a particle filter with Monte Carlo estimation estimates Bayesian models by representing information, including ambiguity, as a probabilistic distribution. Other techniques have involved linearizing high-dimensional problems to achieve a solution more easily.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

In order to address the above shortcomings and additional benefits that will be realized upon reading the disclosure, aspects of illustrative aspects herein describe new particle methods which achieve high-level goals, while having limited ability to affect the world, and limited ability to observe the world.

Aspects described herein include a method of achieving goals while remaining uncertain about certain aspects of the environment. The described method may include receiving sensory information about a world along with high-level goals. The method may then determine probabilities of unknown states of the world and the cost of certain actions in order to achieve a goal for as little cost as possible. The action or set of actions which lead to the goal with as little cost as possible may be the optimal action or set of actions. The method may include a particle method wherein a computational unit assigns a group of possible variables to a single particle. The computational unit may then perform backwards and forwards sweeps of the particles in order to determine in what way the variables change over time in order to achieve the optimal action or set of actions.

In order to achieve a more optimal outcome, particles may be sampled and resampled using a modified Monte Carlo method to ensure particle diversity throughout calculations.

The various aspects of the illustrative embodiments are substantially shown in and/or described in connection with at least one of the following figures, as set forth more completely in the claims.

These and other advantages, aspects, and novel features of the present disclosure, as well as details of illustrated embodiments, thereof, will be more fully understood from the following description and drawings.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

Figure 1:
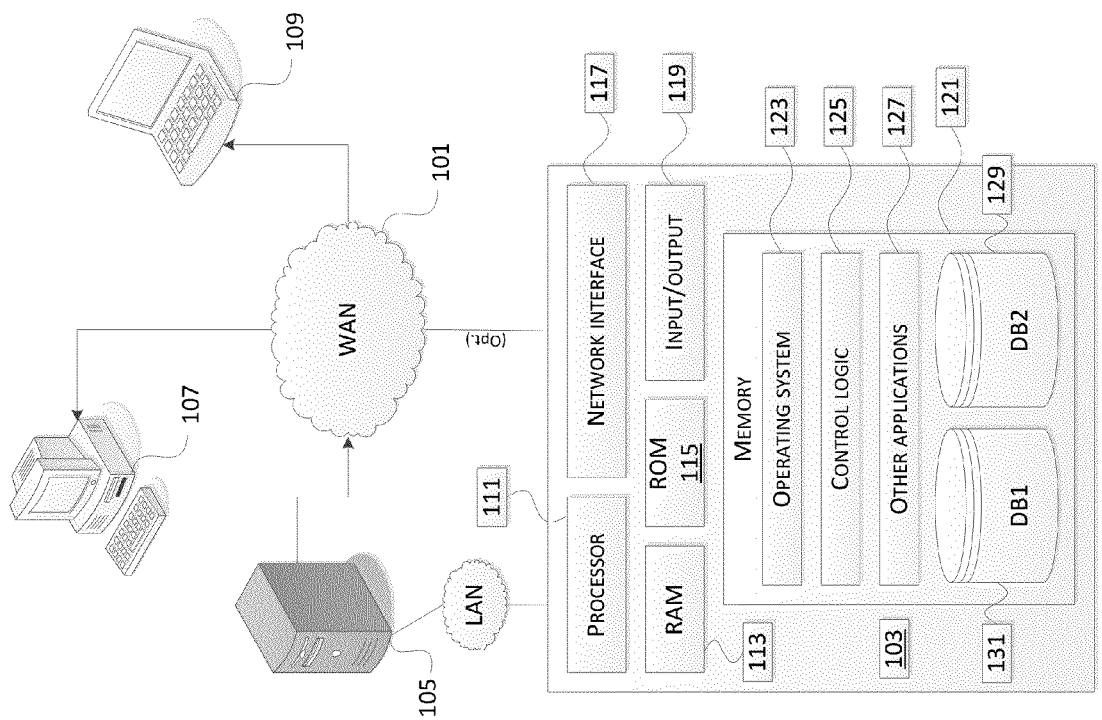
FIG. 1 depicts an illustrative network environment that may be utilized in accordance with various embodiments.

I. Theoretical Description
1. Particle Regulation

We will build our way to the full control problem in steps. To model the pure regulation problem with no estimation, we define deterministic but fully nonlinear dynamics $$\dot{x} = a(t, x, u)$$

$$\dot{v} = c(t, x, u);$$

where x is the state variable, u is the control variable, and v is the scalar cost. We assume $c \geq 0$, $c_{uu} > 0$ to make the problem nondegenerate. The objective is to choose u to minimize the future cost v(T)−v(t) from the current time t up to some possibly infinite time horizon T.

Let f(t,x(t)) be this minimum future cost, which depends only on the current state x(t). Then the fact that we have the freedom to wait to optimize u(t) until time t arrives means that we obtain a backward recursion $$f(t,x(t)) = \min_{u(t)}[(v(t+dt)-v(t))+f(t+dt,x(t+dt))]$$

and so subtracting the left side from both sides, we obtain $$0 = \min_{u(t)}[c(t,x(t),u(t))+f_x(t,x(t))a(t,x(t),u(t))+\dot{f}(t,x(t))]$$

Differentiating by u, and using the assumption that $c_u > 0$, we can see this minimum is attained where $$u = c_u^{-1}(t,x,-f_x(t,x)a_u(t,x,u)).$$

The fact that the minimum is zero then gives an evolution equation for $f$ backward in time from T when it is known. This is the well-known Hamilton-Jacobi-Bellman equation:

$$-\dot{f}(t,x) = c(t,x,u)+f_u(t,x)a(t,x,u);$$

where u is chosen by the previous control equation. The optimal control may not be unique. At such option points, the optimal control u varies discontinuously in x, so that slightly different x yield very different u. The solution $f$ will be continuous there, but will have a kink.

In low dimensions, this first-order partial differential equation can be numerically solved on a grid by an Eulerian method, with numerics paying attention to the direction of characteristics. Where characteristics collide at option points, we must impose an entropy condition to choose the lowest value of $f$. At each point, the control equation can be applied iteratively to solve for u, averaging the right side with enough of the current guess for stability, if necessary. This Eulerian approach to Hamilton-Jacobi type equations has been extensively studied.

In high dimensions, we must solve the equation with a Lagrangian particle method that follows characteristics directly. The result is reverse time dynamics of particles with state (x,$f$,u) of the form $$-\dot{x} = a(t, x, u)$$

$$-\dot{f} = c(t, x, u)$$

$$u = c_u^{-1}\left(t, x, -a_u(t, x, u)\frac{\partial f}{\partial x}\right),$$

where the gradient $\partial f/\partial x$ is effectively a particle interaction term. In contrast to previous work on Lagrangian methods for Hamilton-Jacobi-Bellman equations, we accomplish this interaction without any additional explicit nearest-neighbor structure on the particles, by treating the computation of the gradient as locally weighted linear regression problem. In Section 7, we will explore special consideration for this regression in very high dimensions.

Under these reverse time dynamics, particles will tend to be repelled from optimal control paths to fill out the basin of attraction within which the dynamics can be brought under control. Conversely, particles will tend to be attracted to option points, defining the multiple equally good futures that could arise from those points. The combination of these effects tends to make the particle density highly non-uniform as reverse time increases. For this reason, it is numerically necessary to periodically resample the particles. See Section 8 for sampling considerations.

The entropy condition in this particle formulation corresponds to a rule for particle collisions. Since, with a discrete set of particles, it is difficult to detect collisions that might have occurred with a full set of particles, we can impose the entropy condition approximately by introducing a small amount of viscosity, locally averaging the f-values. This can be accomplished with the same local linear regression used to compute the gradient $\partial f/\partial x$. In the following section, we will show how this averaging should be quantitatively controlled to correspond to a specific noise term added to the original deterministic dynamics.

2. Noisy Particle Regulation

To model just the addition of noise to the original deterministic regulation problem, we define stochastic but fully observable dynamics $$dx = a(t,x,u)dt + s(t,x)dB$$

$$dv = c(t,x,u)dt;$$

where x is the state variable, u is the control variable, v is the scalar cost, and dB is a Brownian motion. We assume $c \geq 0$, $c_{uu} > 0$, and $s^2 > 0$ to make the problem nondegenerate. The objective is to choose u to minimize the expectation of the future cost v(T)−v(t) from the current time t up to some possibly infinite time horizon T.

Let f(t,x(t)) be this minimum future cost, which depends only on the current state x(t). Then the fact that we have the freedom to wait to optimize u(t) until time t arrives means that we obtain a backward recursion $$f(t, x(t)) = \min_{u(t)} E[v(t+dt) - v(t)) + f(t+dt, x(t+dt))]$$

$$= \min_{u(t)} E_{dB}[c(t, x(t), u(t))dt + f(t+dt, x(t) + a(t, x(t), u(t))dt + s(t, x(t))dB]$$

and so subtracting the left side from both sides, we obtain $$0 = \min_u \left[c + \dot{f} + f_x a + \frac{1}{2}f_{xx}^2\right]$$

Differentiating by u, and using the assumption that $c_{uu} > 0$, this minimum is attained, as in the deterministic case, where $$u = c_u^{-1}(-f_x a_u).$$

The fact that the minimum is zero then gives an evolution equation for $f$ backward in time from T when it is known. This is a modification of the Hamilton-Jacobi-Bellman equation by an additional viscosity term:

$$-\dot{f} = c + f_x a + \frac{1}{2}f_{xx}s^2,$$

where u is chosen by the control equation. The special case where a is linear in u and c is quadratic in u has been studied, and efficient linear methods of solution have been found even for high-dimensional problems.

Before explaining the particle method, let us consider how to use particles to approximate the diffusion term $$\frac{1}{2}f_{xx}s^2.$$

At x, this term averages values $f(x')$ against the normal probability measure $n(x,s^2dt)(x')Dx'$ where $Dx'$ is the uniform measure in x', and $n(\mu,\sigma^2)$ is the normal density function. For a particle method, it will be sufficient to approximate $Dx'$ in measure by a sum of delta measures at particle locations. Suppose that particles with locations x' and delta weights q' are given at time t, and that they form a good approximation of the uniform measure at t. Then if we flow the particles from t to t+dt along the deterministic dynamics, the log of the volume of a bundle of particles near x' increases at a rate equal to the divergence of a at x'. This means that for the evolved set of particles and weights to remain an approximation to the uniform measure, log q' must also increase at a rate equal to the divergence of a at x'. If we flow the weights q' according to this rule, then the effect of the diffusion term at x is to take a weighted average of values f(x') with weights $q' n(x,s^2dt)(x')$ over all particles (x',q').

This problem can therefore be solved using particles having state (x,f,q,u), where q is the uniform weight of the particle. The reverse time dynamics are the same as in the deterministic case within each time step, with the addition of the dynamics of the uniform weights:

$$-dx = -a(t, x, u)dt$$

$$-df = c(t, x, u,)dt$$

$$-d\log q = -tr\left(\left(a_x(t, x, u,) + a_u(t, x, u)\frac{\partial u}{\partial x}\right)dt\right)$$

$$u = c_u^{-1}\left(t, x, -a_u(t, x, u)\frac{\partial f}{\partial x}\right).$$

However, to match the diffuse on term we must—following the backward evolution step and prior to computing the new control—replace $f$ at x with the weighted average of $f'$, with weights $q' n(x,s^2dt)(x')$, over all nearby particles (x',f',q',u'). Given that we must also compute the gradient $\partial f=\partial x$ for the control equation by particle interaction, a convenient way to combine the two steps is to interact the particles near x by weighted linear regression of $f'$ against x', with weights $q' n(x,s2dt)(x')$, over all nearby particles (x',f',q',u'). The intercept of the regression will then serve as the new $f$ value at x, and the slope of the regression will serve as the gradient $\partial f/\partial x$ for the calculation of the new u value in the control equation. Similarly, following the computation of the new control u, we must update the value of $\partial u/\partial x$ for use in the next evolution step of q by regressing u against x. As before, periodic resampling of the particles is numerically useful.

Numerical stability of this method requires that the particle spacing be small enough and the time step be properly controlled. To avoid degenerate regression (where only one particle has numerically non-zero weight), the noise cannot be too much smaller than the particle spacing; that is, $s\sqrt{\Delta t}\geq \epsilon \Delta x$, where $\epsilon$ is not too small. To avoid characteristics crossing each other within the time step, we must have $(\nabla \cdot a)(\Delta t)\leq 1$. Together, this means that the optimum settings are $$\Delta x \sim \frac{s}{\sqrt{|\nabla \cdot a|}} \text{ and } \Delta t \sim \frac{1}{|\nabla \cdot a|}.$$

In practice, we must do the best we can with a limited number of particles and a uniform time step for all particles. The best time step we can take is then $$\Delta t \sim \frac{1}{\max|\nabla \cdot a|}.$$

The particles should be sampled with an un-normalized density r chosen to best capture the features of the dynamics. In particular, we can best capture codimension one features of the dynamics by making the un-normalized particle density $$r \propto |\nabla \cdot a|$$

so that particles uniformly sample the values of a in the direction perpendicular to a rapid change in the dynamics. Note that despite the varying particle density, the resulting local particle spacing $$\Delta x \propto r^{1/dimx} \propto \frac{1}{|\nabla \cdot a|^{1/dimx}}$$

does not vary dramatically in very high dimensions. Finally, to maintain stability, we must then invert the previous equations to increase the noise to $$s = \epsilon \frac{\Delta x}{\sqrt{\Delta t}}$$

as a function of the best $\Delta t$ and $\Delta x$ achievable. Section 8 provides an algorithm for sampling particles according to an arbitrary un-normalized sampling density r.

3. The Logic of Particle Control

To model the purely logical part of the full control problem, we now add hidden state while keeping deterministic dynamics:

$$\dot{x}=a(t,x,u)$$

$$\dot{y}=b(t,x,u)$$

$$\dot{v}=c(t,y,u)$$

where x is the hidden state variable, y=m(x) is the observed measurement variable, u is the control variable, and v is the observable scalar cost. We assume $c\geq 0$ and $c_{uu}>0$ to make the problem nondegenerate. Evidently, $b=m_x a$. We are given a prior probability distribution p(0) of the hidden state x (which must project to a single observation y(0)). We also impose a terminal cost $g(y)\geq 0$ at some possibly infinite time horizon T. The objective is to choose u to minimize the expectation of the future cost v(T)−v(t)+g(y(T)) from the current time t up to the time horizon T, given that we can only observe y and not x.

The state of the observer at any time t is defined by an unnormalized probability distribution p(t)(x(t)) of the hidden state x(t) which projects to a single observation y(t). Therefore the minimum expected future cost can be defined by a functional $f(t,p(t))$ of this state. This functional has the terminal boundary condition $$f(T,p(T))=g(y(T)).$$

The fact that we have the freedom to wait to optimize u(t) until time t arrives means that we obtain a recursion for $f$ backward in time:

$$f(t,p(t))=\min_{u(t)} E[c(t,y(t),u(t))dt+f(t+d,p(t+dt))|p(t),u(t)]$$

Thus, in principle, we can compute $f(0,p(0))$ as desired. The apparent difficulty, however, is that $f$ is not just a function, but a functional of a probability distribution, making the dimensionality of the problem exponentially greater. Previous attempts to use particle methods to solve the general control problem have not addressed this key barrier to practical solutions.

To attack this difficulty, we first show we can write this functional in the semi-local form $$f(t,p(t))=E_{p(t)}[f(t,p(t),x(t))],$$

with the aim of turning it into as local a formulation as possible. At the terminal time T we can use a constant function $f(T,p(T),x(T))=g(y(T))$. At times t when no observational information is revealed, p(t+dt) is deterministically evolved as a measure from p(t) by the forward dynamics of x. According to the recursion, the function $f(t,p(t),x(t))$ can then also be evolved from $f(t+dt,p(t+dt),x(t+dt))$ as a function by reverse dynamics of x, plus addition of the constant c(y(t)) dt to the values. At times t when observational information is revealed, p=p(t) breaks up by restriction into unnormalized distributions pi corresponding to the distinct observations y(t) that could result. If $f_i(x)=f(t,p_i,x)$ are the corresponding functions, then the recursion shows that the functions simply glue together as $f=f_i$ corresponding to the distinct observations. Over time, the index i will represent precisely the path y(0), ..., y(t) of observations. This proves the semi-local form by induction, and shows furthermore that the combined unnormalized probability density p(x) simply propagates forwards as a measure by forward dynamics of x, and that the combined cost function $f(x)$ propagates backwards as a function by reverse dynamics of x but also increases at the rate c(y).

In this semi-local formulation, the only part that remains global is the grouping of the x that determines which optimal control u is used for the reverse dynamics of the function $f(x)$ and forward dynamics of the density p(x), with more clumping of x as we progress backwards in time. If we allow ourselves to add a small amount of noise to the control u, then the grouping becomes independent of u, because we can distinguish x not only based on distinct values of b, but also distinct values of $b_u$. In summary, we have the almost purely local reverse time dynamics for f $$-\dot{f}=c+f_x a;$$

where the only global part is that the control u is chosen so that $$0=c_u+E_{p_i}[f_x a_u].$$

with the expectation taken over points that are grouped together by the same observation path index i (with the grouping independent of u). Similarly, we have almost purely local forward time dynamics for p $$\dot{p}=-p_x a-ptr(a_x+a_u u_x);$$

where the only global part is again the choice of control u.

This naturally suggests a particle method, with alternate backward and forward sweeps. The particles have state (x,y,$f$,p,u,i), where p is the unnormalized weight, and i is the observation path index. In the backward sweep, we take p and i as given, and particles have interacting reverse time dynamics $$-\dot{x}=-a(t,x,u)$$
$$-\dot{y}=-b(t,x,u)$$
$$-\dot{f}=c(t,y,u)$$
$$u=c_u^{-1}\left(t,y,-E_{p_i}\left[a_u(t,x,u)\frac{\partial f}{\partial x}\right]\right),$$

where the expectation $E_{p_i}$ is the weighted average taken over particles with the same observation path index i. The gradient $\partial f/\partial x$ is computed by interaction of nearby particles without regard to grouping.

In the forward sweep, the weights p are corrected and propagated forward as constants along the particle trajectory, and the observation path indices i are propagated forward and split based on observational information that is revealed.

Previous work attempting to apply particle methods to modeling the uncertainty p(t) in nonlinear control problems only optimizes a single control path u(t) over all particles generated from the initial uncertainty p(0). This does not allow for the fact that we can wait to optimize u(t) until time t, by which time more information may have been revealed. Their suboptimal solution can be obtained in our algorithm by fixing the grouping to have a single group for all particles for all time.

4. Particle Control

The full control problem has hidden state and stochastic dynamics:

$$dx=a(t,x,u)dt+s(t,x)dB$$
$$dy=b(t,x,u)dt+r(t,x)dB$$
$$dv=c(t,y,u)dt$$

where x is the hidden state variable, y=m(x) is the observed measurement variable, u is the control variable, v is the observed scalar cost, and dB is a Brownian motion. By Ito's Lemma, we have $$b=m_x a+\frac{1}{2}m_{xx}s^2$$

and $r=m_x s$. We assume $c\geq 0$, $c_{uu}>0$, and $s^2>0$ to make the problem nondegenerate. We are given a prior probability distribution p(0) of the hidden state x (which must project to a single observation y(0)). We also impose a terminal cost $g(y)\geq 0$ at some possibly infinite time horizon T. The objective is to choose u to minimize the expectation of the future cost v(T)−v(t)+g(y(T)) from the current time t up to the time horizon T, given that we can only observe y and not x.

Note that because we are including the measurement mechanism y as part of the system x, measurement noise is naturally included as part of the system noise. Also, note that although the noise is infinitesimally normally distributed, the fact that the coefficients of the Brownian motion depend on state means that the noise need not be normally distributed over infinite time intervals.

The state of the observer at any time t is defined by a probability distribution p(t)(x(t)) of the unobserved state x(t), which projects to a single observation y(t). Therefore the minimum expected future cost can be defined by a functional $f(t,p(t))$ of the state. This functional has the terminal boundary condition $$f(T,p(T))=g(y(T)).$$

The fact that we have the freedom to wait to optimize u(t) until time t arrives means that we obtain a recursion for $f$ backward in time:

$$f(t,p(t)) = \min_{u(t)} E[c(t,y(t),u(t))dt + f(t+d,p(t+dt))|p(t),u(t)].$$

Again, this provides a solution in principle, but is not practical because $f$ is a functional of a probability distribution p.

As before, we will try a semi-local formulation $$f(t,p(t)) = E_{p(t)}[f(t,p(t),x(t))],$$

with the aim of turning it into as local a formulation as possible.

Let p(t,x(t)) be the "uninformed" distribution, evolved from p(0) purely by the local, noisy dynamics without using the information about the observations y(0), . . . , y(t). Initially, p(0, x) projects to a single observation y(0). If at some later time, multiple observations y have non-zero probability, then conditional on the actual observation y(t), we can obtain information that allows us to restrict the "informed" distribution p(t) to the part of p(t,x) that projects to y(t).

In the previous section, without any noise, such restricted distributions did not recombine, so we obtained finer and finer restrictions of p(t,x) over time. With noise, we can locally have different observations in one time step and identical observations in the next time step, without any information being revealed. More precisely, the probability distribution of x conditional on noisy observations does not depend on the history of the noise, only on the final observation. The overall probability contributed by any particular history with the same final observation follows a normal distribution, so that the most likely path in retrospect is the deterministic one. Thus locally, the informed distribution is just the restriction of the uninformed distribution the to current observation y(t).

Globally, informed distributions could overlap in this noisy case, but we will make the approximation that each value of the uninformed distribution belongs to the most likely informed distribution. The way to accomplish this, which also works locally, is to assign an index i to each point x; the informed distribution $p_i$ will be the uninformed one restricted to the index i. During the time step, we diffuse i, and let the preliminary new value of i be the most likely index under the diffusion. Finally, we append the information about the new observation y(t) to this preliminary index i. In summary, the index i represents the most likely observation path to the current observation y(t).

We will now show by induction that, given the previous approximation for p(t), it is self-consistent to use a single cost function $f(t,x(t))$. This is true by assumption at the final time T. Expressing the backward recursion in terms of a single cost function (at t+dt by induction, and at t to check whether it can be done self-consistently), we find $$E_{x(t)}[f(t, x(t))] =$$
$$\min_{u(t)} E_{y(t+dt)} c[(t, y(t), u(t))dt + E_{x(t+dt)|y(t+dt)}[f(t + dt, x(t + dt))]] =$$
$$\min_{u(t)} [E_{x(t)} c(t, y(t), u(t))dt +$$
$$E_{dB}[f(t + dt, x(t) + a(t, x(t), u(t))dt + s(t, xt))dB)]].$$

Subtracting the left side from both side, we obtain the equation $$0 = \min_u E_{p_i}\left[c + \dot{f} + f_x a + \frac{1}{2}f_{xx}s^2\right].$$

The minimum is obtained where the following global condition holds:

$$0 = c_u + E_{p_i} f_x a_u,$$

where $E_{p_i}$ is the expectation over the "informed" distribution. Using that optimal control (uniquely defined because the $p_i$ are disjoint), it is self-consistent to use otherwise purely local backward dynamics for $f(x)$:

$$-\dot{f} = c + f_x a + \frac{1}{2} f_{xx} s^2.$$

The "uninformed" local density p(x) can only evolve forward in time because the diffusion of x is an irreversible operation. The forward evolution of p(x) is purely local except for the global choice of control u, and combines the motion of a measure under the deterministic part of the dynamics of x with a term for the diffusion:

$$\dot{p} = -p_x a - p \ tr(a_x) + \frac{1}{2} p_{xx} s^2.$$

Putting together the work of the previous sections, this naturally corresponds to a particle method, with alternate backward and forward sweeps. The particles have state (x,y, f,p,q,u,i), where p is the unnormalized weight, q is the uniform weight, and i is the most likely observation path index. In the backward sweep, we take p and i as given, and then particles have interacting reverse time dynamics $$-dx = -a(t, x, u)dt$$
$$-dy = -b(t, x, u)dt$$
$$-df = -c(t, y, u)dt$$
$$-d \log q = -tr\left(a_x(t; x; u) + a_u(t, x, u)\frac{\partial u}{\partial x}\right)dt$$
$$u = c_u^{-1}\left(t, y, -E_{p_i}\left[a_u(t, x, u)\frac{\partial f}{\partial x}\right]\right).$$

After each backward time step, but before application of the control equation to find the new control, the particles near x interact by weighted linear regression of $f'$ against x', with weights q' n(x,s²dt)(x'), over all nearby particles (x',y',f',p',u', i'). The intercept of the regression will then serve as the new $f$ value at x, and the slope of the regression will serve as the gradient $\partial f/\partial x$ for the calculation of the new u value in the control equation. Similarly, following the computation of the new control u, we must update the value of $\partial u/\partial x$ for use in the next evolution step of q by regressing u against x. To compute the expectation $E_{p_i}$ with respect to the "informed" distribution, because we may not have a good sample of particles for $p_i$ even with a good sample of particles for p, we must interpolate from nearby observation path indices i'. It is numerically useful to resample the particles periodically. See Section 8 for the sampling density and sampling algorithm.

In the forward sweep, we take x,y,$f$,q, and u as given. The weights p are initialized to the original uncertainties, and the indices i are all set to the one-point path (y(0)). They then evolve forward according to $$dp = 0,$$

$$i. = y,$$

where .=indicates appending a value to a path. After each forward step, the particles near x interact by averaging values of p', with weights q'n(x,s²dt)(x'), and extracting most probable values of i', with weights p'q'n(x,s²dt)(x'), over all nearby particles (x',y',f',p',q',u',i').

5. Particle Games

So far we have assumed that the state dynamics, while possibly time dependent, are explicitly known. The simplest way this can fail is if there are unknown parameters in our model of the world. But such parameters can simply be included in the state variables and given zero dynamics. Given a prior p(0), Bayes' Rule will then update our knowledge of them. To obtain the prior p(0), particle learning methods have been developed that make the most efficient use of Bayes' Rule for parameter estimation using a particle approximation.

More seriously, so far we have avoided the social question that we may not be the only optimizer in the world. If there are other actors in the world optimizing back in response to our actions, to predict future costs we have to jointly optimize ourselves and the other actors. Game theory studies precisely these joint optimization questions. However, this approach leads to two important paradoxes we must resolve.

The first paradox is suboptimality. As the classic Prisoner's Dilemma game shows, when joint optimization is achieved by each actor individually optimizing its own costs, suboptimal solutions are often reached, in the sense that there are possible outcomes which would be strictly better for every actor, but are not individually optimal. Given that humans are usually able to reach better solutions through cooperation, there has been recent interest in understanding the game-theoretic basis for this success. The only mathematical loophole in the Prisoner's Dilemma is that if the two actors play not just one, but an indefinitely long sequence of Prisoner's Dilemma games (with probability of playing again sufficiently high), then cooperation becomes an individually optimal solution because the other actor can always impose future punishment for current non-cooperation. This leads to a social solution to the paradox: communication between social actors can effectively turn individual games with specific actors into an indefinitely long sequence of games with society as a whole, with punishment coordinated within society via communication. For our purposes, it is enough to know that in the case of finite terminal times T<1, we should construct the terminal cost function differently from the incremental cost function, so that states that are mutually optimal in the incremental cost are also individually optimal in the terminal cost. The backward sweep will then propagate cooperation backward from there.

The second paradox is recursive rationality. If the state of the world that we try to discover includes another actor's prior, with the other actor's dynamics defined by optimal actions based on that prior, then our prior must actually be a meta-distribution over possible priors of this actor. But then this actor's prior must similarly be a meta-distribution, meaning that our prior must be a meta-meta-distribution, and so on. This recursive assumption is called Common Knowledge of Rationality (CKR). Clearly, CKR is computationally intractable. Fortunately, CKR has also been shown to be self-contradictory. Humans do think somewhat recursively about what other humans think about what they're thinking, but not to an unlimited depth. For our purposes, we can support limited recursion by including all of the (finitely many) parameters of our "mental model" of other actors, and others' mental model of us, in the state of the world. We may then have a prior over this state, but other actors are not allowed to recursively think about this prior; similarly, other actors may then have a prior over this state, but we are not allowed to recursively think about this prior.

The game problem therefore looks formally similar to the control problem:

$$dx = a(t,x,u)dt + s(t,x)dB$$

$$dy = b(t,x,u)dt + r(t,x)dB$$

$$dv = c(t,y,u)dt$$

except that now v is a vector of costs, one for each actor, u is a matrix of control vectors per actor, and y is a matrix of observation vectors per actor. We assume that one actor's controls do not directly cost any other actor, so that off-diagonal blocks of $c_u$ are zero. As initial conditions, we are given a vector of priors p(0) for all of the actors. We also impose a vector of terminal costs g(y) for all actors (as explained above, this should be a forward-looking cost that bakes in future punishment). The objective is to simultaneously minimize all of the expectations of the future costs v(T)−v(t)+g(y(T)) from the current time up to the time horizon T, given that each actor can only observe its own part of y. With proper matrix interpretation, most of the mathematics of the game problem is the same as for the control problem, except that due to individual optimization, we must replace the control equation with $$\mathrm{diag}(c_u + E_{p_i}[f_x a_u]) = 0.$$

6. Particle Emotions

Emotions are a means for communicating important statistics about the individual's control problem to the body, and in social animals, also to other individuals. For example, fear is an emotion that communicates uncertainty about a possible bad outcome of the individual's control problem. The purpose of communicating the fear emotion to the body is to trigger adrenaline, which allows more rapid response in the face of uncertainty. The purpose of communicating it to other individuals via the stereotypical facial expression of fear is to allow the other individuals to raise their awareness as well.

Expectation of future pleasure creates happiness and of future pain creates sadness. The statistic that quantifies this is the expectation of v (T) relative to v (t); a low expectation results in a happy emotion, while high expectation results in a sad emotion. This relative expectation is exactly f(t), which we already compute.

Uncertainty about future outcomes creates tension, which is experienced as fear for unhappy tension and excitement for happy tension. The statistic that quantifies this is the variance of v(T); a high variance results in a fear emotion during experience of the sad emotion, and results in an excitement emotion during experience of the happy emotion. Otherwise, low variance results in a calm emotion. To compute the variance of v(T), let $f_2(t)$ denote the expectation of $(v(T)-v(t))^2$. Then the variance of v(T) is given by $f_2(t) - f^2(t)$, and $f_2(t)$ can be computed in terms of a local square cost function $f_2(t,x)$ as $f_2(t) = E_{p(t)}[f_2(t,x)]$. The local square cost function can in turn be computed by backward induction as $$-\dot{f}_2 = 2cf + (f_2)_x a + \frac{1}{2}(f_2)_{xx} s^2.$$

So far we have described emotions that are statistics of the backward sweep, but there are forward emotions as well.

Observations that have relatively low probability according to the individual's prior knowledge p create surprise. Sad surprise results in a frightened emotion, while happy surprise results in a funny emotion.

7. Particle Interaction

To approximate the interaction term $\partial f/\partial x$ in very high dimensions, where the dimension could exceed the number of particles, we need to make use of the geometric structure of the set of dimensions N. For example, if the dimensions represent values of a physical field in one spatial dimension, the geometry of the set of dimensions is a line. Alternatively, if the dimensions have discrete relationships (such as a hierarchical classification), the geometry of the set of dimensions can be represented by a graph (a tree in the case of pure hierarchy).

The least presumptive gradient m is the one with the least geometric information when considered as a function on N, where geometric information is measured by the total variation energy $$|m|_{TV} = \int_N \left|\frac{\partial m}{\partial n}\right| Dn.$$

This energy totals up the size of a boundary between different values of the function times the absolute change in the value across that boundary. The definition can be applied to discrete geometries such as graphs, as well as continuous geometries.

Let m be our estimate of the augmented gradient, considered either as vector or as a function on N, as appropriate. (Augmented means there is an extra coordinate to account for the constant term in the regression.) Further let F be the vector of $f$ values for the particles, and X the matrix whose rows are the augmented x values for the particles. Then we apply weighted linear regression with a total variation penalty, minimizing the convex function $$|F-Xm|^2 + \lambda |m|_{TV}.$$

Here $|\cdot|$ is the weighted $l^2$ vector norm with particle weights chosen to regress only against nearby particles, as prescribed by the previous sections.

In very high dimensions, where the number of dimensions is greater than the number of particles, this optimization is not strictly convex, and so the essentially unique minimum may actually be a convex set of minima. For an iterative optimizer, the choice of minimum will then depend on the initial guess. When used as part of the timestepping methods presented above, the initial guess should be the result from the previous time step, for stability.

8. Particle Sampling

If the system is smooth and slowly varying, uniform sampling of particles with uniform weights may be appropriate. However, if the system has features—places where the system varies rapidly or discontinuously—uniform sampling may miss them. In this case, as is typical in Monte Carlo methods, we must employ importance sampling. In this technique, we sample particles more densely near features, but lower their uniform weights q proportionally, so that the entire set of weighted particles still approximates the uniform distribution. As explained in Section 2, to capture features of codimension one, we need a sampling density proportional to the local rate of change of the dynamics. Similarly, we care most about particles with high observational probability p; we also want to apply importance sampling to sample more densely in regions of high p.

Given a desired un-normalized sampling density r(x), we could in principle use the standard Metropolis algorithm to generate a sample of particles at each time step. This is very expensive, however, because that algorithm generates autocorrelated samples, and so we must discard most of its output. Fortunately, because at each time step we already have an approximate sample, perturbed only by the local dynamics of the system, we can use a dynamic Metropolis algorithm that starts with a given approximate sample and in a few steps produces from it a better one with approximately the same number of particles. The key is that we don't care if individual particles are correlated between time steps.

The way the dynamic Metropolis algorithm works is that for each original particle $x_b$, we draw a symmetric jump to another location $x_e$, as in the standard algorithm, but then place a new particle at $x_b$ with probability $$\max\left(0, 1 - \frac{r(x_e)}{r(x_b)}\right)$$

and, independently, possibly another new particle at $x_e$ with probability $$\min\left(1, \frac{r(x_e)}{r(x_b)}\right).$$

In this way, in the long run, $x_b$ and $x_e$ have the right likelihood ratio, and the average number of particles remains constant. Because we don't care that the original particle $x_b$ is correlated with the new particles $x_b$ and/or $x_e$, and because the original particles are already approximately correctly distributed, only a few iterations of this dynamic algorithm are required per time step. This can be achieved in a logarithmic number of iterations, by choosing the jump size to provide annealing, that is, the jump size should be exponentially decaying over the resampling iterations, starting from the largest displacement of the dynamics and going down to the smallest feature size of the dynamics.

10. Discrete Particle Control

There is an analog of the particle control algorithm for discrete state spaces. The statement of the discrete problem is $$t \to t+1$$

$$x \to A(t,x,u)$$

$$y \to B(t,x,u)$$

$$v \to v + C(t,y,u)$$

where t is the discrete time, x is the discrete hidden state variable, y=m(x) is the discrete observed measurement variable, u is the discrete control variable, and v is the continuous observed scalar cost. Here also, the state dynamics is represented by a stochastic function A that returns a new state from a distribution depending on t, x, u, and the stochastic measurement function is B(t,x,u)=m(A(t,x,u)). We are given a prior probability distribution p(0) of the hidden state x (which must project to a single observation y(0)).

We also impose a terminal cost g(y)≥0 at some possibly infinite time horizon T.

The objective is to choose u to minimize the expectation of the future cost v(T)−v(t)+g(y(T)) from the current time t up to the time horizon T, given that we can only observe y and not x.

To solve this, we will, as in the continuous case, try to express the minimum expected future cost functional $\mathfrak{f}(t,p(t)) = E_{p(t)}[\mathfrak{f}(t,x(t))]$ as the expectation of a single cost function $\mathfrak{f}(t,x(t))$ of the hidden state. The backward induction for the cost functional then looks like $$E_{x(t)}[f(t, x(t))] =$$
$$\min_{u(t)} E_{y(t+dt)}[c(t, y(t), u(t)) + E_{x(t+1)|y(t+1),u(t)}[f(t+1, x(t+1))]] =$$
$$\min_{u(t)} E_{x(t)}[c(t, y(t), u(t)) + E_{x(t+1)|x(t),u(t)}[f(t+1, x(t+1))]]$$

This equation will hold if the single cost function obeys $$\mathfrak{f}(t,x(t)) = c(t,y(t),u(t)) + E_{x(t+1)|x(t),u(t)}[\mathfrak{f}(t+1,x(t+1))].$$

The optimization is then to choose u(t) to minimize $$\min_{u(t)} E_{x(t)}[\mathfrak{f}(t,x(t))|u(t)],$$

where f(t,x(t)) is computed from u(t) by the previous equation.

To make this self consistent, we need to have a unique choice of u(t) for each x(t) and p(t). As before, we will approximate the set of p(t) that need to be considered in the backward induction of the cost functional as being the restrictions of the uninformed distribution p(t,x(t)) to sets of states sharing the same most likely observation path i(t)=y(0) ... y(t). This makes the informed distributions disjoint and allows us to assign a unique control u(t) to the states x(t) in the support of each disjoint informed distribution $p(t) = p_{i(t)}$. The uninformed distribution p(t,x(t)) propagates forward according to the dynamics x(t+1)|x(t),u(t).

In summary, the semi-local approximation computes a single cost function $\mathfrak{f}(t,x)$ and an uninformed distribution p(t,x) as follows.

The cost function is computed by backward induction as $$\mathfrak{f}(t,x) = c(t,y,u) + E_{x'\sim A(t,x,u)}[\mathfrak{f}(t+1,x')]$$

where u is chosen for each value of the most likely observation path i to minimize $$\min_u E_{x \sim p_i}[\mathfrak{f}(t,x)|u]$$

where $p_i$ is the informed distribution corresponding to i.

The uninformed distribution is computed by forward induction as $$p(t+1,x') \sim (x' \sim A(t,x,u)|x \sim p(t,x))$$

and the observational information i is propagated forward as the most likely value of the concatenation i.y at x' under the dynamics $x' \sim A(t,x,u)$ The informed distributions $p_i$ are the uninformed distribution p(t,x) restricted to each distinct value of i.

To turn this into a particle method, we choose a subset of the discrete states x, and for each such state have particle data (x,y,$\mathfrak{f}$,p,q,u,i), where f is the value of the single cost function $\mathfrak{f}(t,x)$, p is the unnormalized weight of the uninformed distribution p(t,x), q is the number of states represented by the particle, and i is the most likely observation path. For efficiency, we will assume that the dynamics A have some kind of locality, to prevent the forward and backward induction steps from becoming quadratic in the number of particles. In the forward sweep, p is propagated forward by distributing the weight across samples of the forward dynamics, and i is propagated forward as most likely values. In the backward sweep, f is propagated backward by averaging over future particles reached by the forward state dynamics, while u is optimized to minimize the resulting f.

To compute emotions as explained in Section 6, we must similarly compute a local square cost function $\mathfrak{f}_2(t,x)$, so that the variance of the total future cost is $E_{p_i}[\mathfrak{f}_2] - (E_{p_i}[\mathfrak{f}])^2$. Since we are averaging the square cost over all future states, the local square cost function is determined by backward induction as $$\mathfrak{f}_2(t,x) = C(t,y,u)^2 + 2C(t,y,u)E_{x'\sim A(t,x,u)}[\mathfrak{f}(t+dt,x')] + E_{x'\sim A(t,x,u)}[\mathfrak{f}_2(t+dt,x')].$$

II. Illustrative System Architecture

In the following description of the various embodiments, reference is made to the accompanying drawings, which form a part hereof, and in which is shown by way of illustration various embodiments in which the aspects described herein may be practiced. It is to be understood that other embodiments may be utilized and structural and functional modifications may be made without departing from the scope described herein. Aspects are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

FIG. 1 illustrates one example of a network architecture and data processing device that may be used to implement one or more illustrative aspects. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include computational unit 103, web server 105, and client devices 107, 109. Computational unit 103 may be a general or special-purpose computer or computer farm. Computational unit 103 may be a computational unit that provides overall access, control and administration of databases and control software for performing one or more illustrative aspects described herein. Computational unit 103 may be connected to web server 105 through which users interact with and obtain data as requested. Alternatively, computational unit 103 may act as a web server itself and be directly connected to the Internet. Computational unit 103 may be connected to web server 105 through the network 101

(e.g., the Internet), via direct or indirect connection, or via some other network. Computational unit 103 may have significant ability to run multiple instances of the described method in parallel. Computational unit 103 may also have significant bandwidth for communication of data between multiple instances of described method. Users may interact with the computational unit 103 using remote devices 107, 109, e.g., using a web browser to connect to the computational unit 103 via one or more externally exposed web sites hosted by web server 105. Devices 107, 109 may be used in concert with computational unit 103 to access data stored therein, or may be used for other purposes. For example, from device 107 a user may access web server 105 using an Internet browser, as is known in the art, or by executing a software application that communicates with web server 105 and/or computational unit 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and computational unit 103 may be combined on a single server.

Each component 103, 105, 107, 109 may be any type of known computer, server, or data processing device. Computational unit 103, e.g., may include a processor 111 controlling overall operation of the rate server 103. Computational unit 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing computational unit 103 to perform aspects described herein, and other application software 127 providing secondary, support, and/or other functionality which may or may not be used in conjunction with aspects described herein. The control logic may also be referred to herein as the computational unit software 125. Functionality of the computational unit software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
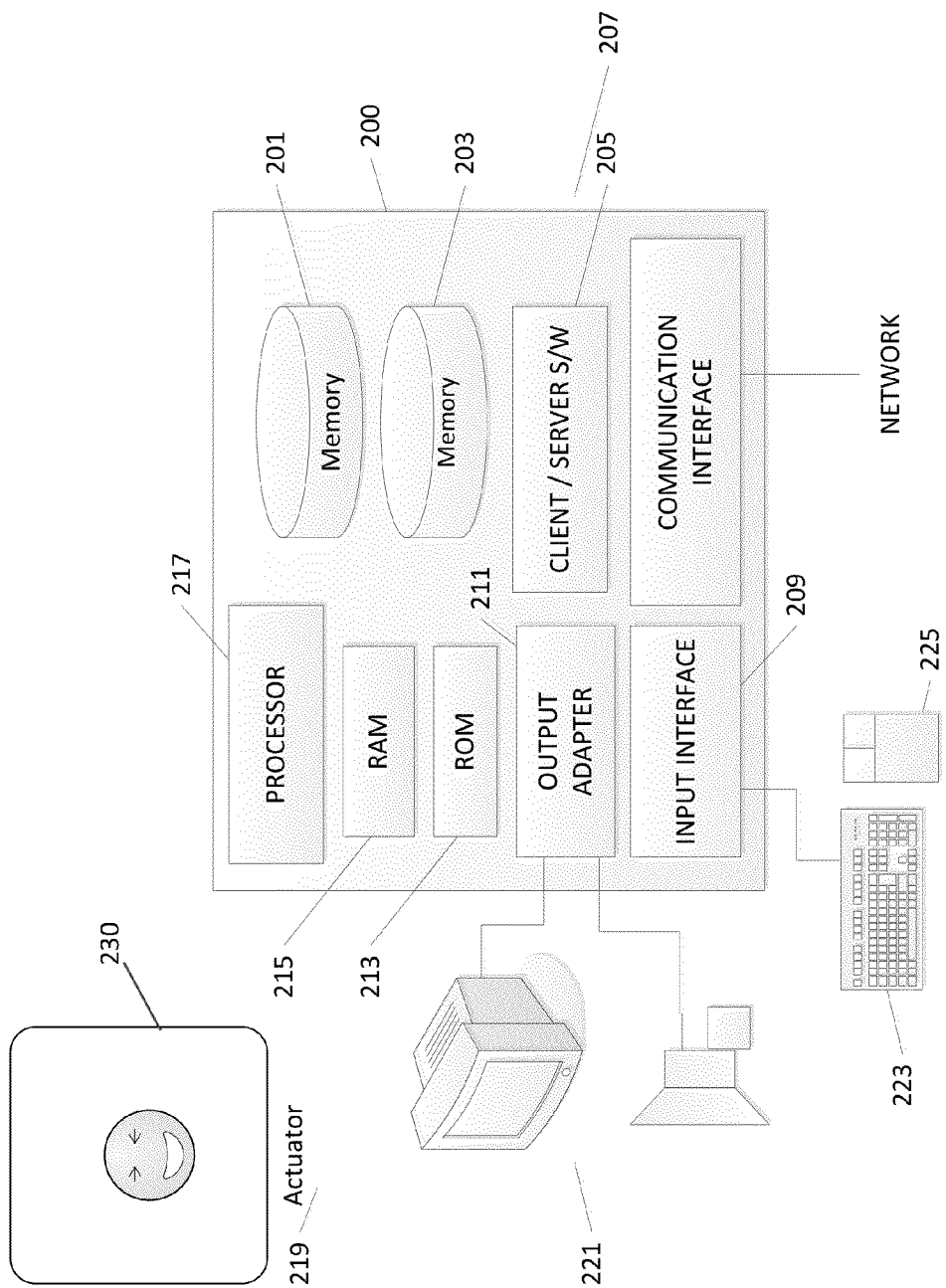
FIG. 2 illustrates an example user device that may be used in a network environment, such as either a client device or a server in the network environment of FIG. 1, in accordance with illustrative aspects described herein.

As described above, the computational unit 103 may perform methods described herein. FIG. 2 illustrates an example user device 200 such as device 107 (shown in FIG. 1) with which a user may access and communicate with computational unit 103. User device 200 and computational unit 103 may be part of the same device or may be separate devices. User device 200 may include a variety of components and modules including a processor 217, random access memory (RAM) 215, read only memory (ROM) 213, memories 201 and 203, which may include one or more collections of data, such as databases, client or server software 205, output adapter 211, input interface 209 and communication interface 207. Processor 217 may include a graphics processing unit (GPU) or a separate GPU may be included in the output adapter 211. Memory 201 may be configured to store electronic data, inclusive of any electronic information disclosed herein. Another memory, such as memory 203, may be configured to store different or overlapping data. In one embodiment, memories 201 and 203 may be a single, non-transitory computer-readable medium Each memory 201, 203 may or may not include a database to store data or include data stored in RAM memory, accessed as needed by the client/server software. Data associated with the method described may be communicated between user device 200 and a computational unit 103 or a server through a transceiver or network interface, such as communication interface 207.

One or more statutory computer-readable mediums, such as medium 201 or 203 may be configured to contain sensor/server software (graphically shown as software 205). Sensor software 205 may, in one or more arrangements, be configured to identify observational data as well as facilitate or direct communications between two devices, including remote devices 109 and/or communications devices, among other devices. A user may control the device, through input interface 209 using various types of input devices including keyboard 223 and mouse 225. Other types of input devices may include a microphone (e.g., for voice communications over the network), joysticks, motion sensing devices, touchscreens 219 and/or combinations thereof. In one or more arrangements, music or other audio such as speech may be included as part of the user experience with the device. Further collection of observational data may be facilitated through cameras, GPS, accelerometers, chemical detectors, or any other such input structures that may aid in gathering observational data. In such instances, the audio may be outputted through speaker 221. Further, this observational data may be limited to a virtual world. In such embodiments, observational data may be produced and inputted via computers or other computational units. Such observational worlds may include, but are not limited to, video games and simulator programs. In such embodiments, observational data may contain virtual data, such as virtual chemical compositions and virtual acceleration. Such observational data may include instead or in addition to virtual sensory data, data regarding the state of a computational device which runs, compiles, or outputs such described virtual world. Data regarding the state of a computational device may include but is not limited to the amount of RAM/ROM currently being used, battery life, or the progression of a program.

In some embodiments, the actions dictated by the method described may be performed by actuators 230. These actuators 230 may comprise any structure or separate device which outputs directions to perform an action to a user or itself performs some of or all of the action dictated by the method described. Such actuators 230 may include, but are not limited to, various machines such as automobiles or computers, appliances such as alarm clocks or washing machines, and robotic or artificially intelligent entities such as automated personal assistants. Such actuators 230 may be physically a part of user device 200 or computational unit (such as 103 shown in FIG. 1). Actuators 230 may also interact with user device 200 or computational unit 103 through a network (such as 101 shown in FIG. 1). Actuator 230 may provide instructions and possible outcomes of directed actions to a user through an output device. Actuator 230 may also express emotions to the user indicating how a course of action may emotionally affect the user. Such emotion may be expressed through facial structure of a virtual face or through the tone of a virtual voice providing instructions to the user. Actuator 230 also may be used to perform specific tasks in order to achieve a goal which may be inputted into the method described. In a real-world setting, actuator 230 may perform any of a myriad of tasks including but not limited to decelerating a vehicle if its driver is emotionally distraught, closing the windows of a dwelling if a new pet seems particularly adventuresome, or collecting a user's favorite foods before a user is hungry in order to avoid traffic later. In a virtual setting, actuators 230, may perform any actions that an actuator may in a real-world setting. Also, an actuator 230 may be a virtual character in a game or simulation which performs actions or expresses emotion dictated by the method described.

Software 205, computer executable instructions, and other data used by processor 217 and other components of user device 200 may be stored in memories, 201, 203, RAM 215, ROM 213 or a combination thereof. Other types of memory may also be used, including both volatile and nonvolatile memory. Software 205 may be stored within RAM 215, ROM 213 and/or memories 201 and 203 to provide instructions to processor 217 such that when the instructions are executed, processor 217, device 200 and/or other components thereof are caused to perform functions and methods described herein. In one example, instructions for generating a user interface for interfacing with a server 105 or user device 107 may be stored in RAM 215, ROM 213 and/or databases 201 and 203. Software 205 may include both applications and operating system software, and may include code segments, instructions, applets, pre-compiled code, compiled code, computer programs, program modules, engines, program logic, and combinations thereof. Computer executable instructions and data may further be stored on some physical form of computer readable storage media (referred to herein as "computer memory") including, e.g., electrically erasable programmable read-only memory (EEPROM), flash memory or other memory technology, CD-ROM, DVD or other optical disk storage, magnetic cassettes, magnetic tape, magnetic storage and the like. Software 205 may operate to accept and process observational data so that it may be used by the method described. There may also be software 205 that relays actions dictated by the method to the user. In some cases such software 205 may produce a text or voice list of instructions. Also, software 205 may allow an actuator to perform an action dictated by the method.

Figure 3:
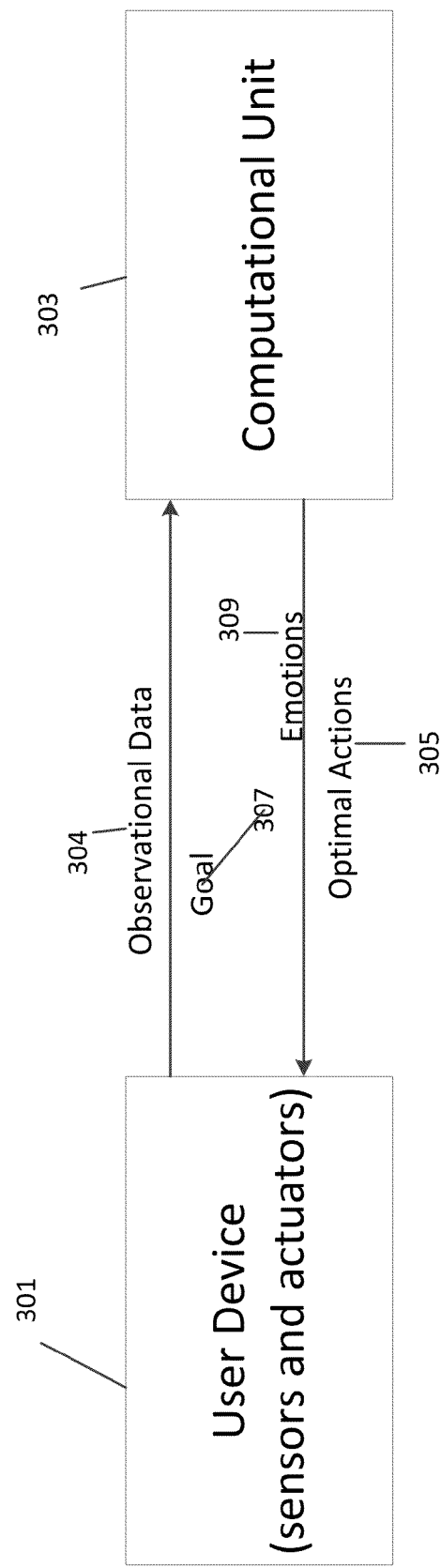
FIG. 3 illustrates a general view of interactions between a user device and a computational device during iterations of the method according to illustrative aspects described herein.

FIG. 3 shows a general view of possible communication between a user device 301 and the computational unit 303 which performs the method described. In the shown embodiment, the user device 301 contains the input structures as well as the actuators. As described above, however, such a user device 301 need not contain all those elements. As shown in FIG. 3, the user device 301 relays observational data 304 to the computational unit 303. A user may also input a goal 307 to be achieved into the user device to be relayed to the computational unit 303. Such a goal 307 may be a high-level goal including not being hungry while simultaneously not gaining weight, not wasting any food, and not spending over $300 a month on food. The described observational data 304 and goals 307 may be communicated to the computational unit 30 through any of various methods of communication exemplified in the above description of FIG. 1. Using that observational data 304 and goals 307, the computational unit performs the described particle method in order to determine optimal actions 305 to achieve goal 307. Computational unit 303 may also determine emotions 309 associated with the optimal actions 305. Such optimal actions 305 and/or emotions 309 are then outputted to an actuator, here associated with the user device, 301. The actuator may then display instructions according to the optimal actions 305 and/or emotions 309 or perform the optimal actions itself.

Figure 4:
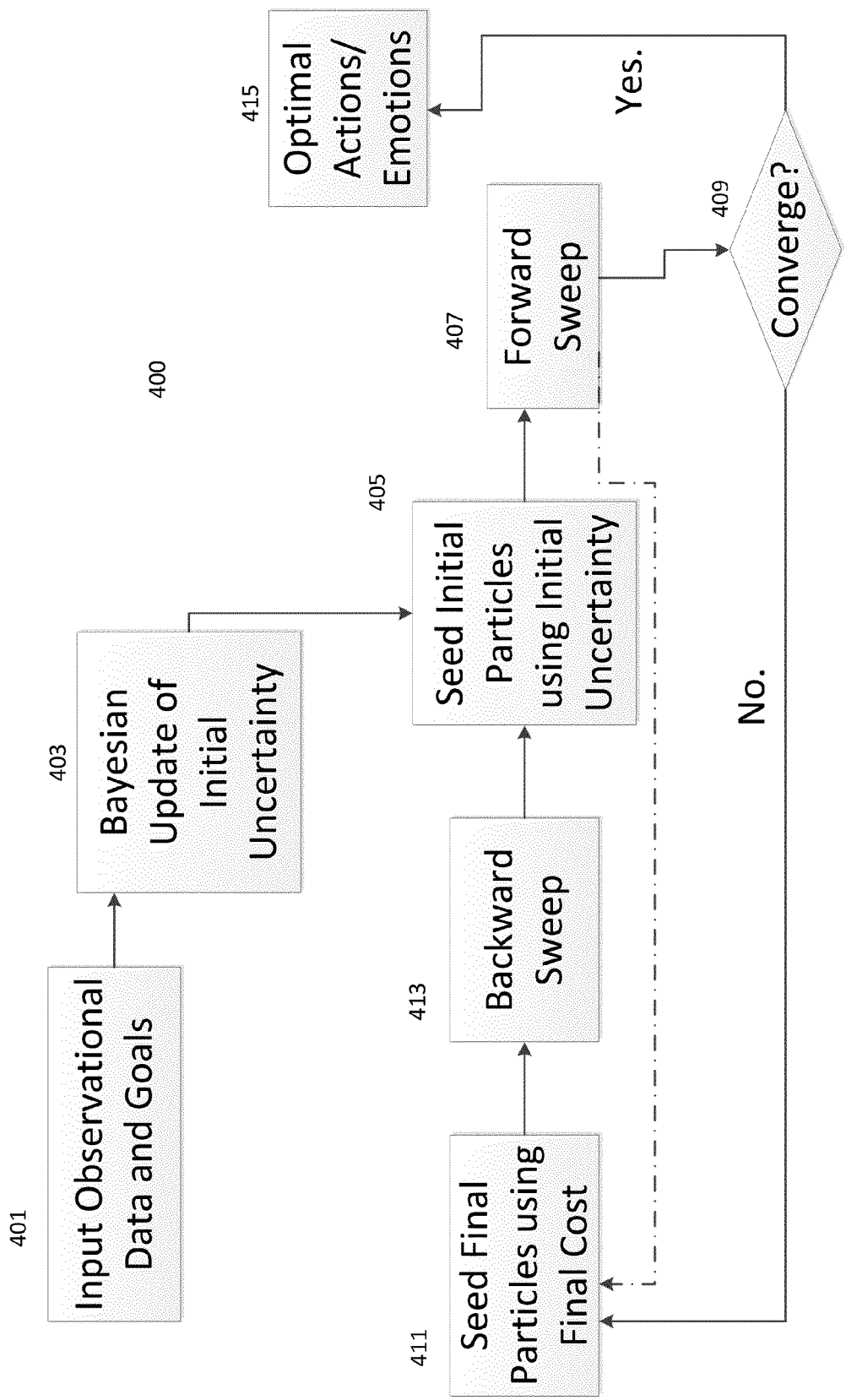
FIG. 4 illustrates an overview of steps of a particle method according to illustrative aspects described herein.

The computational unit 303 may perform particle methods as described herein. FIG. 4 provides a general view of a particle method 400. A particle method 400 begins with the step of inputting the observational data and high level goals 401. The observational data may include observed states of the world, represented as a function, y, in the computational unit (not shown). As stated above, this world may be real or virtual. The observational data may also include the average rate of change observed in the world, represented by a function, a, which is a function of time, the state of the world, and whatever actions have been or may be performed. The observational data may also include the standard deviation of the rate of change of world state as a function of time and world state, represented by a function, s. Further, the observational data may include the measurement process that yields observational data as a function of time and world state, represented as a function, m. High-level goals may be encoded as a function c, representing the incremental cost as a function of time, observational data, and actions; and optionally a function g, representing a terminal cost at the final time as a function of the final observation. The goal of the particle method is to determine actions that achieve the specified goal while minimizing the total expected future cost. The output of the particle method may also includes macroscopic statistics of the control problem, such as the expected future cost and the variance of future cost, which can be used to compute emotions.

The particle method may be formulated in terms of a multiplicity of particles, which are data structures that include the following scalar and vector variables:
t time
x unknown state of the world y observational data at time t
i most likely observation history prior to time t
u action
$f$ expected future cost
$f_2$ expected square future cost
p unnormalized probability, representing uncertainty about the state of the world
q uniform weight The overall operation of the particle method may include a set of preparation steps followed by a simulation loop. The set of preparation steps take the new observational data, and create an initial set of particles consistent with this observation and representing any uncertainty about the unknown state of the world. This may be obtained from a previous initial set of particles by the Particle Learning algorithm, which performs a Bayesian update of the uncertainty in a particle representation. The result of the preparation step is a new set of initial particles with new values of x,y,i,p, and q. In such an embodiment, as shown in FIG. 4, the set of preparation steps proceeds as follows: observational data and goals and inputted into the computational unit in step 401, the computational unit then performs a Bayesian Update of the uncertainty in a particle representation in step 403, the computational unit then seeds the final particles using the uncertainty achieved through the Bayesian update in step 405, the computational unit then performs a forward sweep of the particles in step 407. In the set of preparation steps, the computational unit skips the convergence step of the particle method and continues to step 411 in which it seeds final particles using final cost. Once the set of preparation steps have been completed, the computational unit performs the simulation loop.

During the simulation loop, the computational unit repeats a sequence of four steps until convergence is achieved: seeding final particles in step 411, backward sweep in step 413, seeding initial particles in step 405, and forward sweep in step 407. The loop breaks and returns the calculated optimal actions and emotions in step 415 once convergence is achieved in step 409. The computational unit may determine convergence when values of $f$, $f_2$, and u are no longer changing after the backward sweep, and the values of p and i are no longer changing after the forward sweep. The backward and forward sweep steps will be explained in more detail below. The seeding of final particles uses the optional terminal cost to initialize the values of $f$ and $f_2$. The seeding of initial particles uses the initial particles from the preparation step to initialize the values of p and i.

The computational device may compute emotions as macroscopic statistics of the control problem. The expected future cost $f$ leads to a happy emotion if the value is low, and a sad emotion if the value is high. The variance of future cost, $f_2 - f^2$, leads to a tense emotion if the value is high, and a calm emotion if the value is low. Happy tension may be expressed as an excited emotion, while sad tension may be expressed as a fear emotion. The determined optimal actions and/or emotions are outputted to an actuator in step 415.

Figure 5:
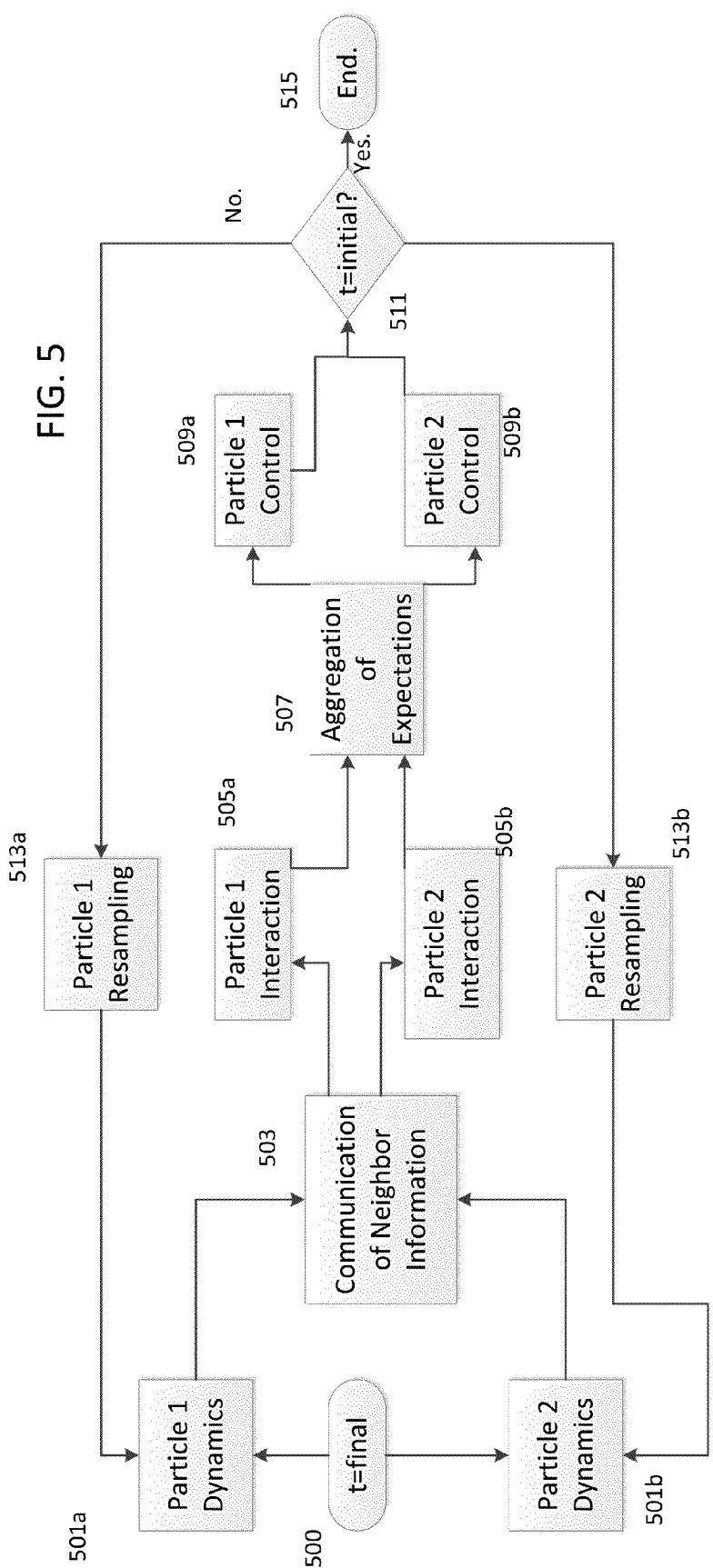
FIG. 5 illustrates steps of a backward sweep portion of a particle method according to illustrative aspects described herein.

FIG. 5 describes an illustrative embodiment of the backward sweep in more detail. The computational unit may perform the backward sweep as a parallel particle method in which each particle, in one embodiment, may be run in a separate processing unit, with some communication between processing units. FIG. 5 specifically exemplifies the backward sweep with two particles. The structure of the computation may extend to any number of particles in the same way. Overall, the backward sweep generally may be described as a loop that runs backward in time from the final time to the initial time in discrete time steps dt<0.

For each iteration of the loop, the computational unit may perform a number of steps. In FIG. 5 the backward sweep begins when time is final, as shown in step 500. The computational unit may apply average backward time dynamics to each particle in steps 501a and 501b. Because each particle is a data structure consisting of the scalar and vector variables detailed above, the application of those dynamics changes those variables in the following way:

$$dx = -a(t, x, u)|dt|$$
$$df = c(t, y, u)|dt|$$
$$df_2 = 2c(t, y, u)f|dt|$$
$$d \log q = -tr\left(a_x(t, x, u) + a_u(t, x, u)\frac{\partial u}{\partial x}\right)|dt|.$$

In the embodied case, the computational unit may determine the derivative $\partial u/\partial x$ from a previous interaction step as described below.

In step 503, the computational unit allows neighboring particles to communicate to each other information about their values of $x, f, f_2, u$, and q. This communication does not require any predetermined structure on the set of particles, but may instead use unstructured spatial sorting of the state variables x, for example by means of decision trees.

In steps 505a and 505b, for each particle, the computational unit then calculates the diffused values of $f$ and $f_2$, and the derivatives $\partial f/\partial x$ and $\partial u/\partial x$, by means of weighted linear regression, where the weight of each set of neighboring values is q times the normal weight corresponding to the standard deviation s over time |dt|.

In step 507, the computational unit aggregates expectations for each value of the most likely observation history i. In a preferred embodiment the expectation computed is.

$$E_{p_i}\left[a_u(t, x, u)\frac{\partial f}{\partial x}\right].$$

The unnormalized probabilities $p_i$ used in computing the expectation are the values of p restricted to particles that share the chosen observation history i. This aggregation only requires the computational unit to provide communication between particles with the same value of i, which can be accomplished in using unstructured spatial sorting of the observation history variables i, for example by means of decision trees.

In steps 509a and 509b, the computational unit determines a candidate for optimal action by means of the control equation:

$$u = c_u^{-1}\left(t, y, -E_{p_i}\left[a_u(t, x, u)\frac{\partial f}{\partial x}\right]\right).$$

The equation is calculated in terms of the expectation computed by the aggregation step. For stability, it may be necessary for the computational unit to average the right hand side of the control equation with a certain amount of the previous value of the action u. Also, for convergence, it may be necessary for the computational unit to repeat the aggregation and control steps a number of times until the new value of u is no longer changing.

In step 511, the computational unit determines whether the time equals the initial time. If so, the computational unit closes the loop in step 515 and seeds initial particles as shown in step 405 of FIG. 4. If not, the computational unit proceeds to steps 513a and 513b in which the computational unit resamples the particles in order to again perform backward dynamics in steps 501a and 501b. The computational unit may resample the particles in steps 513a and 513b by means of the Dynamic Metropolis method.

Figure 6:
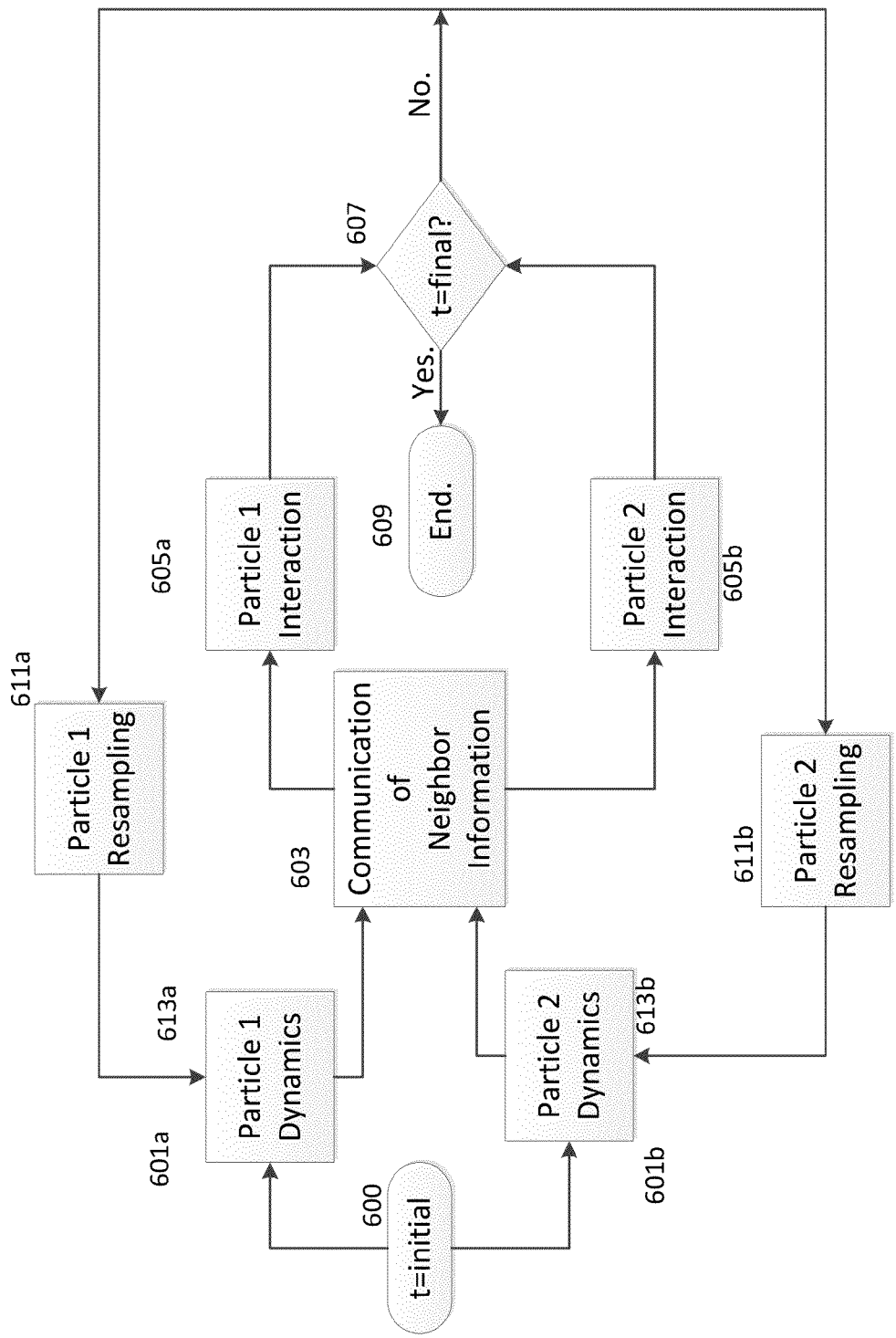
FIG. 6 illustrates steps of a forward sweep portion of a particle method according to illustrative aspects described herein.

After the completion of the backward sweep, the computational unit seeds the initial particles as shown in step 405 of FIG. 4. The computational unit may perform the forward sweep as a parallel particle method in which each particle, in one embodiment, may be run in a separate processing unit, with some communication between processing units. FIG. 6 illustrates the forward sweep with two particles as an example. The structure of the computation may extend to any number of particles in the same way. Overall, the forward sweep generally may be described as a loop that runs forward in time from the initial time to the final time in discrete time steps dt>0.

For each iteration of the loop, the computational unit may perform a number of steps. In FIG. 6 the backward sweep begins when time is initial, as shown in step 600. Then computational unit may apply average forward time dynamics to each particle in steps 601a and 601b. Because each particle is a data structure consisting of the scalar and vector variables detailed above, the application of those dynamics changes those variables in the following way:

$$dx = a(t,x,u)dt,$$

$$dp = 0, \text{ and}$$

$$i.=y.$$

In the above, .=represents appending a value to a sequence.

In step 603, the computational unit allows neighboring particles to communicate to each other information about their values of x, p, i, and q. This communication does not require any predetermined structure on the set of particles, but may instead use unstructured spatial sorting of the state variables x, for example by means of decision trees.

Then, in steps 605a and 605b, for each particle, the computational unit calculates the diffused value of p, and the most likely value of i. The computational unit may calculate the diffusion of p by weighted linear regression of the density values p/q, where the weight of each set of neighboring values is q times the normal weight corresponding to the standard deviation s over time dt. The computational unit may calculate the most likely value of i using different weights. In a preferred embodiment, the likelihood weight of each set of neighboring values is the density value p/q times the normal weight corresponding to the standard deviation s over time dt.

In step 607, the computational unit determines whether the time equals the initial time. If so, the computational unit closes the loop in step 609 and determines whether the optimal actions converge as shown in step 409 of FIG. 4. If not, the computational unit proceeds to steps 611a and 611b in which the computational unit resamples the particles in order to again perform forward dynamics in steps 601a and 601b. The computational unit may resample the particles in steps 611a and 611b by means of the Dynamic Metropolis method.

As stated in the description of FIG. 4, above, after the forward sweep, the computational unit determines whether the candidates of the optimal action converge. If so, the optimal actions and/or emotions are outputted in step 415. If not, the computational unit proceeds to step 411, in which it seeds the final particles and performs another backwards sweep, step 413.

For efficiency and accuracy, it may be necessary that the computational unit focus its attention properly while conducting the particle control method. That is, the computational unit may sample the particles non-uniformly. In order to do so, the computational unit may sample particles more densely near states x of the world where the dynamics of the world change rapidly as a function of x or u. Also, the computational unit may sample the particles more densely near states x of the world that are going to be more probable according to the probability values p of the simulation. Based on these two criteria, the computational unit may formulate a desired sampling density r(x) for the particles. The Metropolis Algorithm is a standard means of achieving a given sampling. However, said algorithm is very inefficient for use with the disclosed particle control method, typically requiring many autocorrelated samples to be discarded along the way. Fortunately, by using the particle control method, the computational unit usually has a good approximate sample from a previous or subsequent time step. The Dynamic Metropolis method may improve the quality of the sample.

Figure 7:
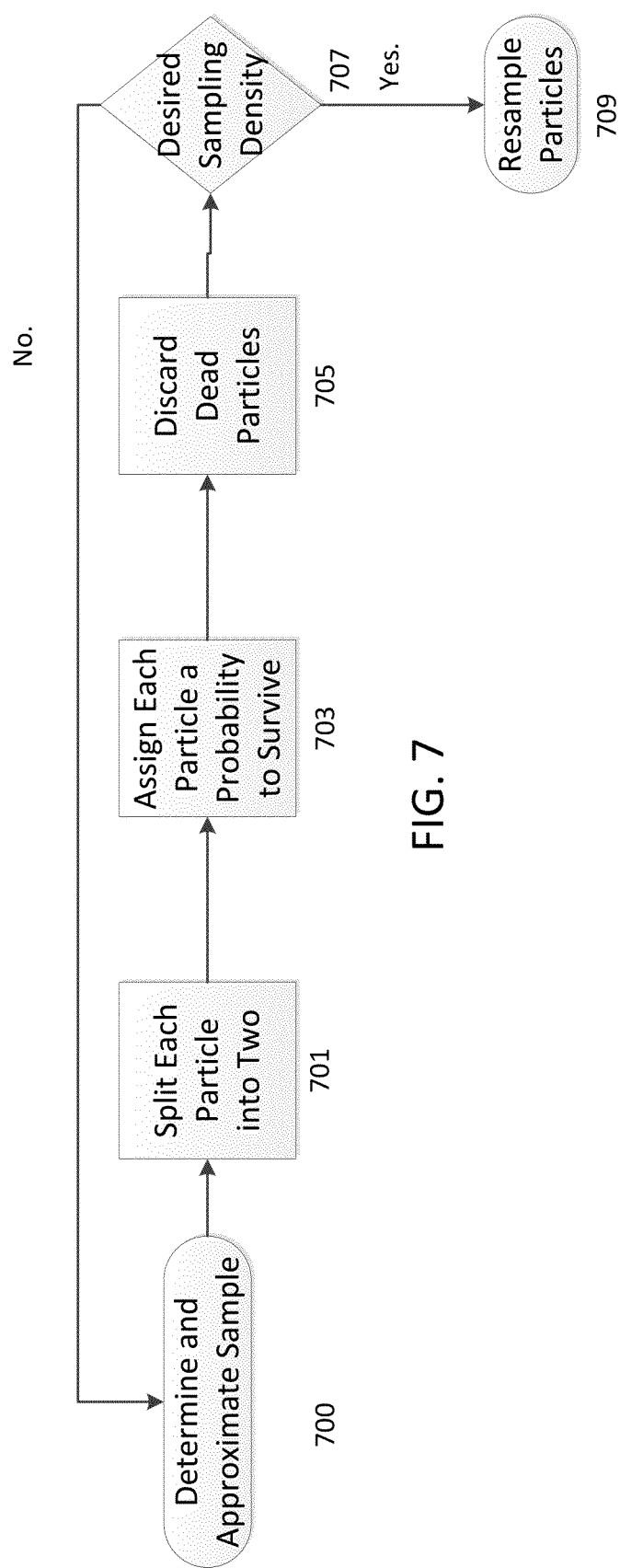
FIG. 7 illustrates steps of a Dynamic Metropolis method for resampling of particles during a particle method.

FIG. 7 shows a possible embodiment of the Dynamic Metropolis method introduced above as a method of resampling particles. The computational unit may begin the Dynamic Metropolis method with determining an approximate sample in step 700. The computational unit then splits each particle in the sample into two: the original particle at x, and a new particle at x' randomly displaced from the original by a symmetric jump distribution. In step 703, the computational unit then independently assigns each particle probabilities to survive: the original particle with probability $$\max\left(0, 1 - \frac{r(x')}{r(x)}\right),$$

and the new particle with probability $$\min\left(1, \frac{r(x')}{r(x)}\right).$$

The computational unit then discards dead particles in step 705. Once the dead particles are discarded, the computational unit determines if the desired sampling density has been reached in step 707. If so, the computational unit will resample the particles. If not, the computational unit will repeat step 700 on the new particles. The computational unit may perform the iteration loop as many times as necessary to achieve the desired sampling density.

III. Illustrative Use Case Scenario

The components of the described particle control method will now be explained in an example of a personal assistant. In this example, this personal assistant may be specifically concerned with helping the user satisfy his or her need for food.

The device configuration may include the user's own commodity smartphone as the user device, and a remote server farm maintained by a service provider as the computational unit. These two may communicate over the wireless and wired Internet. To sign up, the user may install an application onto the smartphone that collects observational data from the smartphone's built in sensors, such as GPS (location), clock (time), camera (visual input), microphone (acoustic input), keyboard (text input), and readable custom data from other applications. The application may also effect actions and express emotions using the smartphone's built in actuators, such as display (visual output), speaker (acoustic output), vibration (kinetic output), and writeable custom data to other applications. This application may collect time, location, purchase information (from a payment application on the smartphone), information on food store location and hours (via custom data retrieved from mapping applications on the smartphone), and user commands (via keyboard or speech-to-text). This application may provide the user with recommended actions either visually or acoustically; visually, the application may display text, maps, and emotion icons; acoustically, the application may use text-to-speech to state recommended actions, with different tones of voice to indicate different emotions.

The basic variables in the algorithm represent the following:

t=clock time;

x=state of the world, parts of which may not be known, such as the amount, location, and freshness of food available from various sources (home, store, or on person); whether or not each store is open; the hunger level of the user; what food the user has purchased or eaten, etc.;

y=the known part of x;

u=actions the user can take, such as going to different locations (home, store); buying, storing, or eating food.

The basic model functions represent the following:

a=average mechanics of the world: this includes the fact that hunger increases over time until the user eats, that the user can move from location to location and carry food, that food spoils if not properly stored, that eating spoiled food causes sickness, that food in stores can only be carried if the store is open and the user purchases the food, etc.;

s=randomness of mechanics of the world: rate of increase of hunger and rate of food spoilage cannot be predicted exactly; stores may be unexpectedly closed despite posted hours; movement from location to location could be slowed due to weather; traffic; etc.;

c=high-level goals are determined by assigning incremental costs: to being hungry, in proportion to the level of hunger, eventually resulting in a very high cost for starvation; to exerting effort to travel from location to location; to paying money; to being sick.

The computational unit may then simulate a multiplicity of particles, each corresponding to a possible state x of the world that is consistent with what is known now, weighted with probabilities p which are updated as each observation comes in. As such, a particle may correspond to a possible state wherein traffic beyond the next corner is at a standstill and rain will fall in five minutes with a probability of 30%. Another particle may correspond to a possible state wherein traffic beyond the next corner moves quickly and there will be no rain for the next hour with a probability of 50%.

The computational unit then may perform a series of backward and forward sweeps on the particles in order to achieve an optimal action to relay to the user device. During the backward sweep, the computational unit may assume a terminal time associated with a terminal cost. The computational unit may hold constant those variables that propagate forward with time and determine an optimal action based on the way that the backward propagating variables change as time moves backward. The computational unit then may hold constant those variables that propagate backward with time and determine an optimal action based on the way that the forward propagating variables change as time moves forward. The process continues until the optimal action determined by the backward sweep converges with the optimal action determined by the forward sweep.

After completing the particle control method, the computational unit may relay the recommended action u to the user device. The user device may provide a recommended action u, either by text on the display or by text-to-speech through the speaker. This recommended action could consist of avoiding turning on the next corner because traffic likely will be at a standstill and rain may fall.

Coupled with the determination of an optimal action may be a determination of an emotion associated with a particular action. The computational unit may determine that a particular action will likely result in a particular emotion. The computational unit may determine these emotions using the variance of an expected future cost, given by $f_2(t)-f^2(t)$, where $f_2$ denotes the expectation of the square of the difference of future cost and present cost. A low expectation may result is a happy emotion; while a high expectation may result in a sad emotion. The level of variance may affect the level of excitement or calm the user might feel. The device may also express said emotions based on $f$ and $f_2$, either by displaying an icon of a face expressing the emotion on the display, or by altering the tone of voice of the text-to-speech module.

Moreover, the optimal action and/or emotions determined by the described method may provide not only immediate recommendations, but an entire strategy, complete with hypothetical scenarios. This strategy may develop in the form of recommended actions u at future times depending on the projected history of observations i. For example, the device could tell the user ahead of time that if the first store is unexpectedly closed, the next step in the plan is to go to a different specified store.

The strategies determined by this method may plan ahead to achieve long-term goals. For example, if the user is not hungry at a present time, but the stores will close soon, the algorithm may still recommend that the user go to the store, buy food, go home, store the food, and then retrieve and eat the food at home later when the inevitable hunger comes.

The strategies may take these uncertainties into account. For example, if there are three stores with equal probabilities of having food in stock and equal distances from home, but two are close to each other, the method may recommend going to the close pair because that may allow increased probability of obtaining food with little additional effort, by potentially trying both stores of the pair.

The strategies may be flexibly adapted in real-time in response to events. For example, if the user is on the way to a particular store based on a recommendation from the algorithm, and mapping data indicate that the road has suddenly been closed due to an accident, the algorithm may recompute the strategy and divert the user to the closest store that does not use that road. The user may receive recommended actions until a goal, such as satisfying a user's need for food is achieved.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving, by a sensor, a current observation about a real or simulated world;
   maintaining, by a computational unit, an objective;

representing the objective using an incremental cost of a plurality of potential actions;

maintaining, by the computational unit, a current uncertainty about an unknown state of the world, wherein the current uncertainty is updated using the current observation; and determining, by the computational unit, one or more optimal actions to achieve the objective with an optimized expected total future cost, wherein said determining comprises performing both backward induction on the optimized expected total future cost and forward induction on the uncertainty about the unknown state of the world.

2. The method of claim 1, further comprising:

determining a first number t, which represents a future time;

determining a first vector x, which represents the unknown state of the world at time t;

determining a second vector u, which represents a potential action at time t;

determining a sequence of vectors i, called the information, which represents the preferred history of observations from the current time up to time t, leading to state x;

determining a first function $f(t,x)$, called the local cost function;

determining a first probability distribution $p(t,x)$, called the unconditional uncertainty, which represents the uncertainty of the plurality of unknown states x of the world at time t, unconditional on future observations;

wherein said induction comprises:

restricting the set of future uncertainties conditional on observations that need to be considered to probability distributions of the form $p_i(t,x)$, which comprises the restriction of the unconditional uncertainty $p(t,x)$ to states x having the same information i at time t;

representing the expected total future cost at time t with information i as $E_{pi}[f]$, where the operator $E[\,]$ represents the expectation of a function with respect to a probability distribution;

determining the local cost function $f$ by backward induction;

determining the unconditional uncertainty p and the information i by forward induction; and determining the optimal actions u by optimization for each value of the information i and time t.

3. The method of claim 2, wherein the steps of representing the objective and the stochastic dynamics of the world include:

determining second number dt, which represents the time step;

determining a third vector y, which represents the observation at time t;

determining a first stochastic function $A(t,x,u)$, called the dynamics, whose values provide the random distribution of state after time step dt when starting from state x and taking the potential action u at time t;

determining a second stochastic function $B(t,x,u)$, called the measurement, whose values provide the random distribution of observations after time step dt when starting from state x and taking the potential action u at time t; and determining a second function $C(t,y,u)$, which represents the incremental cost over time step dt of the potential action u, based in part on the observation y, at time t, wherein backward induction determines f at time t from time t+dt by:

$f(t,x) = C(t,y,u) + E_{x' \sim A(t,x,u)}[f(t+dt,x')]$ where ~ denotes the distribution of a stochastic variable, wherein forward induction determines p at time t+dt from time t by:

$p(t+dt,x') \sim \{x' \sim A(t,x,u) | x \sim p(t,x)\}$ and determines i at time t+dt from time t as a preferred value of i appended with the observation y, and wherein the optimization of the potential actions determines u at time t by:

$u = \arg\min E_{pi}[f(t,x)|u]$.

4. The method of claim 3, further comprising determining an approximate solution of the backward and forward induction equations by means of an unstructured sample, comprising:

determining a sample of particles such that each particle in the sample possesses:

an instance of time t, an instance of the unknown state x, an instance of the observation y, an instance of the potential action u, an instance of the value of the local cost function $f$, an instance of the information i, an instance of a weight w representing the probability assigned by the unconditional uncertainty p, and an instance of a uniform weight q representing the relative number of states of the world represented by this sampled particle;

repeating, until convergence is achieved, the following unordered steps:

initializing the instance of the value $f$ of the local cost function of each particle to a known terminal cost, performing a backward sweep in time of the instance of the value $f$ of the local cost function on the sampled particles, determining a candidate for the optimal potential action u at the current time, initializing the instance of the weight w of each particle to approximate the known current uncertainty about the unknown state of the world, initializing the instance of the information i of each particle to the known current observation y, performing a forward sweep in time of the instance of the weight w and the instance of the information i on the sampled particles, determining whether the instance of the weight w and the instance of the information i have converged for all particles at a terminal time, or whether the candidate for the optimal action u has converged at the initial time; and identifying one or more optimal actions as candidate optimal actions in the final iteration of this sequence of steps when convergence has been achieved.

5. The method of claim 4, wherein performing the backward sweep comprises repetition of the following unordered steps until the current time is reached:

propagating the particles backward in time;

performing particle interactions; and optionally resampling the particles, and wherein the forward sweep comprises repetition of the following unordered steps until the terminal time is reached:

propagating the particles forward in time;

performing particle interactions; and optionally resampling the particles.

6. The method of claim 5 wherein the computations involved in each step in respect of each particle is carried out by means of a parallel computational sub-unit, and the particle interactions are effected by means of communication between the parallel computational sub-units.

7. The method of claim 5 wherein the sampling or resampling particles further includes:
   determining a desired un-normalized particle sampling density r(x); and
   employing importance sampling according to the desired un-normalized sampling density r(x).

8. The method of claim 7 wherein the step of employing importance sampling according to the un-normalized density r(x) comprises applying, one or more times, the following sequence of steps to all particles in the old sample to produce the new sample:
   starting with an old particle with state x;
   randomly drawing a symmetric jump from state x to another state x';
   creating, with a probability of min(1, r(x')/r(x)) a new particle with state x';
   creating, independently and with probability max(0, 1−r(x')/r(x)), a new particle with state x.

9. The method of claim 3, wherein the computation of the variance of the total future cost under the assumption of optimal actions is obtained as:

$$E_{pi}[f_2] - (E_{pi}[f])^2,$$

wherein the local square cost function $f_2(t,x)$ is determined by backward induction according to the equation:

$$f_2(t,x) = C(t,y,u)^2 + 2C(t,y,u)E_{x'-A(t,x,u)}[f(t+dt,x')] + E_{x'-A(t,x,u)}[f_2(t+dt,x')].$$

10. The method of claim 2, wherein the steps of representing the objective and the stochastic dynamics of the world include:
    determining a third vector y, which represents the observation at time t;
    determining a second function c(t,y,u), which represents the incremental cost of the potential action u, based in part on the observation y, at time t;
    determining a third function a(t,x,u), called the expected dynamics, which represents the average rate of change of the state x when the potential action u is taken at time y;
    determining a fourth function s(t,x), called the noise, which represents the standard deviation of the rate of change of the state x at time t; and
    determining a fifth function m(t,x), called the measurement, which represents the measurement process that yields the observation y in state x at time t.

11. The method of claim 10, wherein the local cost function $f$ is determined by backward induction according to the backward time differential equation:

$$-\dot{f} = c + f_x a + \frac{1}{2}(f)_{xx} s^2;$$

the unconditional uncertainty p is determined by forward induction according to the forward time differential equation:

$$p_t = -p_x a - p\, tr(a_x + a_u u_x) + \frac{1}{2} p_{xx} s^2;$$

and wherein for each i, a representation of a potential action, u, is an optimal action and t is determined by the equation:

$$u = c_u^{-1}(-E_{pi}[a_u f_u]).$$

12. The method of claim 11, further including determining an approximate solution of the backward and forward differential equations, comprising:
    determining a sample of particles such that each particle in the sample possesses:
      an instance of time t,
      an instance of the unknown state x,
      an instance of the observation y,
      an instance of the potential action u,
      an instance of the value of the local cost function $f$,
      an instance of the information i,
      an instance of a weight w representing the probability assigned by the unconditional uncertainty distribution p,
      an instance of a uniform weight q representing an approximation of a uniform probability distribution on unknown states at time t;
    repeating the following sequence of steps until convergence is achieved:
      initializing the instance of the value $f$ of the local cost function of each particle to a known terminal cost,
      performing a backward sweep in time of the instance of the value $f$ of the local cost function on the sampled particles,
      determining a candidate for the optimal potential action u at the current time,
      initializing the instance of the weight w of each particle to approximate the known current uncertainty about the unknown state of the world,
      initializing the instance of the information i of each particle to the known current observation y,
      performing a forward sweep in time of the instance of the weight w and the instance of the information i on the sampled particles,
      determining whether the instance of the weight w and the instance of the
      information i have converged for all particles at a terminal time; and
    identifying one or more optimal actions as candidate optimal actions in the final iteration of this sequence of steps when convergence has been achieved.

13. The method of claim 12 wherein performing the backward sweep comprises repetition of the following steps until the current time is reached:
    propagating the particles backward in time;
    performing particle interactions; and
    optionally resampling the particles, and
    wherein the forward sweep comprises repetition of the following steps until the terminal time is reached:
    propagating the particles forward in time;
    performing particle interactions; and
    optionally resampling the particles.

14. A method of simulating an emotional response, comprising:
    receiving, by a sensor, a current observation about a real or simulated world;
    maintaining, by a computational unit, an objective;

representing the objective using an incremental cost of a plurality of potential actions;

maintaining, by the computational unit, a current uncertainty about an unknown state of the world, wherein the current uncertainty is updated using the current observation;

determining, by the computational unit, one or more optimal actions to achieve the objective with an optimized expected total future cost;

determining, via the computational unit, a statistic of the computation determining the optimal actions, corresponding to a simulated emotion; and communicating a representation of the emotion to the world.

15. The method of claim 14, wherein the statistic of the computation is the optimized expected total future cost, of which low values correspond to a happy emotion and high values correspond to a sad emotion.

16. The method of claim 14, wherein the statistic of the computation is the variance of the total future cost under an assumption of optimal actions, of which low values correspond to a calm emotion and high values correspond to a tense emotion, wherein a combination of tense and sad emotions is interpreted as a fearful emotion, and wherein a combination of tense and happy emotions is interpreted as an excited emotion.

17. The method of claim 14, wherein the statistic of the computation is the covariance of the total future costs of two competing objectives under an assumption of optimal actions, the first objective representing the self, and the second objective representing another actor in the world, of which a negative value in combination with a sad emotion is interpreted as an angry emotion, and a negative value in combination with a happy emotion is interpreted as a gloating emotion, and a positive value in combination with a happy emotion is interpreted as a loving emotion.

18. A system comprising:
a sensor configured to receive input defining a current observation about a real or simulated world;
a computational unit configured to:
maintain an objective,
represent the objective using an incremental cost of a plurality of potential actions,
maintain a current uncertainty about an unknown state of the world, wherein the current uncertainty is updated using the current observation, and
determine one or more optimal actions to achieve the objective, wherein said determining comprises performing both backward induction on the minimum expected total future cost and forward induction on the uncertainty about the unknown state of the world.

19. The system of claim 18, further comprising an actuator configured to effect the one or more optimal actions based on instructions from the computational unit.

20. The method of claim 1, further comprising effecting, via an actuator, the one or more optimal actions.

* * * * *